United States Patent
Cronin et al.

(10) Patent No.: US 9,864,737 B1
(45) Date of Patent: Jan. 9, 2018

(54) CROWD SOURCING-ASSISTED SELF-PUBLISHING

(71) Applicant: Rich Media Ventures, LLC, Miami, FL (US)

(72) Inventors: John Cronin, Bonita Springs, FL (US); Neil Balthaser, Montreal (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

(21) Appl. No.: 15/142,410

(22) Filed: Apr. 29, 2016

(51) Int. Cl.
| G06Q 30/00 | (2012.01) |
| G06F 17/24 | (2006.01) |
| G06F 3/0482 | (2013.01) |
| G06F 3/0484 | (2013.01) |
| G06Q 30/06 | (2012.01) |
| G06Q 20/12 | (2012.01) |

(52) U.S. Cl.
CPC ............ *G06F 17/24* (2013.01); *G06F 3/0482* (2013.01); *G06F 3/04842* (2013.01); *G06Q 20/12* (2013.01); *G06Q 30/0611* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 6,011,537 | A | 1/2000 | Slotznick |
| 6,189,097 | B1 | 2/2001 | Tycksen et al. |
| 6,341,174 | B1 | 1/2002 | Callahan et al. |
| 6,480,861 | B1 | 11/2002 | Kanevsky et al. |
| 6,611,358 | B1 | 8/2003 | Narayanaswamy |
| 6,704,024 | B2 | 3/2004 | Robotham et al. |
| 7,213,062 | B1 | 5/2007 | Raciborski et al. |
| 7,263,685 | B2 | 8/2007 | Eldar |
| 7,298,851 | B1 | 11/2007 | Hendricks et al. |
| 7,552,068 | B1 | 6/2009 | Brinkerhoff |
| 7,620,555 | B1 | 11/2009 | Plotkin |
| 7,711,513 | B2 | 5/2010 | Sotirou |
| 7,941,399 | B2 | 5/2011 | Bailor et al. |
| 8,005,825 | B1 | 8/2011 | Ghosh |
| 8,312,079 | B2 | 11/2012 | Newsome et al. |

(Continued)

OTHER PUBLICATIONS

U.S. Appl. No. 15/142,819, John Cronin, Smart Content Insertion for Publishing Tools, filed Apr. 29, 2016.

(Continued)

*Primary Examiner* — Ethan D Civan
(74) *Attorney, Agent, or Firm* — Polsinelli LLP

(57) ABSTRACT

An author using an author device may connect to a self-publishing network and identify a content selection that includes text from the author's manuscript. The content selection may be presented to a number of crowd editors through their crowd editor devices. The crowd editors may submit edited selections that include edits to the content selection. The author may then select a first edited selection of the edited selections and purchase that edited selection to be included in the manuscript, which also allows the author to then interact with a first content editor who edited the first edited selection. The author may send the first content editor a closed bid to edit more of the author's manuscript, which the first content editor can accept or decline, or negotiate. The author may alternately send more open bids to all or a subset of the crowd editors.

19 Claims, 7 Drawing Sheets

(56) References Cited

U.S. PATENT DOCUMENTS

| | | |
|---|---|---|
| 8,346,585 B1 | 1/2013 | Griffith et al. |
| 8,392,538 B1 | 3/2013 | Lee |
| 8,423,889 B1 | 4/2013 | Zagorie et al. |
| 8,487,775 B2 | 7/2013 | Victor et al. |
| 8,666,961 B1 | 3/2014 | Qureshi et al. |
| 8,700,699 B2 | 4/2014 | Shen et al. |
| 8,725,565 B1 | 5/2014 | Ryan |
| 8,755,058 B1 | 6/2014 | Jackson |
| 8,826,036 B1 | 9/2014 | Snodgrass et al. |
| 8,885,882 B1 | 11/2014 | Yin et al. |
| 8,922,569 B1 | 12/2014 | Tidd |
| 9,087,056 B2 | 7/2015 | Cohen |
| 9,116,991 B2 | 8/2015 | Vemula et al. |
| 9,317,186 B2 | 4/2016 | MacLean et al. |
| 9,331,856 B1 | 5/2016 | Song |
| 9,348,935 B2 | 5/2016 | Doig et al. |
| 9,378,299 B1 | 6/2016 | Rashidi |
| 9,575,615 B1 | 2/2017 | Nicholls et al. |
| 2002/0006788 A1 | 1/2002 | Knutsson et al. |
| 2003/0172052 A1 | 9/2003 | Crandell et al. |
| 2003/0177200 A1 | 9/2003 | Laughlin et al. |
| 2004/0107348 A1 | 6/2004 | Iwamura |
| 2005/0039034 A1 | 2/2005 | Doyle et al. |
| 2005/0071758 A1 | 3/2005 | Ehrich et al. |
| 2005/0081041 A1 | 4/2005 | Hwang |
| 2005/0177805 A1 | 8/2005 | Lynch et al. |
| 2005/0193335 A1 | 9/2005 | Dorai et al. |
| 2006/0218476 A1 | 9/2006 | Gombert |
| 2007/0168237 A1 | 7/2007 | Campbell |
| 2007/0239704 A1 | 10/2007 | Burns et al. |
| 2008/0013915 A1 | 1/2008 | Gill et al. |
| 2008/0139191 A1 | 6/2008 | Meinyk et al. |
| 2008/0232598 A1 | 9/2008 | Vennelakanti et al. |
| 2008/0243662 A1 | 10/2008 | Subramaniam |
| 2009/0019356 A1 | 1/2009 | Deyab et al. |
| 2009/0254802 A1 | 10/2009 | Campagna et al. |
| 2010/0003333 A1 | 1/2010 | Victor et al. |
| 2010/0086278 A1 | 4/2010 | Stankiewicz et al. |
| 2010/0205029 A1 | 8/2010 | Asherman et al. |
| 2011/0289108 A1 | 11/2011 | Bhandari et al. |
| 2012/0047455 A1 | 2/2012 | Yuan et al. |
| 2012/0105486 A1 | 5/2012 | Lankford et al. |
| 2012/0150680 A1 | 6/2012 | Golus et al. |
| 2012/0150993 A1 | 6/2012 | Flack et al. |
| 2012/0192254 A1 | 7/2012 | Garcia Perez et al. |
| 2012/0200573 A1 | 8/2012 | Stoner et al. |
| 2012/0240039 A1 | 9/2012 | Walker et al. |
| 2012/0246557 A1 | 9/2012 | Venugopal et al. |
| 2012/0323842 A1* | 12/2012 | Izhikevich ............. G06Q 10/10 707/608 |
| 2012/0325901 A1 | 12/2012 | Ross |
| 2013/0007036 A1 | 1/2013 | Childs et al. |
| 2013/0054622 A1 | 2/2013 | Karmarkar et al. |
| 2013/0066746 A1 | 3/2013 | O'Hara et al. |
| 2013/0073998 A1 | 3/2013 | Migos et al. |
| 2013/0132230 A1 | 5/2013 | Gibson et al. |
| 2013/0166340 A1* | 6/2013 | Salame .................. G06Q 30/08 705/7.14 |
| 2013/0191708 A1 | 7/2013 | Song |
| 2013/0205232 A1 | 8/2013 | Vandermolen et al. |
| 2013/0283147 A1* | 10/2013 | Wong ..................... G06Q 10/10 715/234 |
| 2014/0006308 A1 | 1/2014 | Baggott et al. |
| 2014/0019562 A1 | 1/2014 | Le Chevalier et al. |
| 2014/0019766 A1 | 1/2014 | Takahashi et al. |
| 2014/0074648 A1 | 3/2014 | Morton et al. |
| 2014/0115449 A1 | 4/2014 | Migos et al. |
| 2014/0115508 A1 | 4/2014 | MacLean et al. |
| 2014/0172505 A1 | 6/2014 | Dekhtyaruk |
| 2014/0201180 A1 | 7/2014 | Fatourechi et al. |
| 2014/0210855 A1 | 7/2014 | Cohen |
| 2014/0253694 A1 | 9/2014 | Zustak et al. |
| 2015/0019874 A1 | 1/2015 | Kim et al. |
| 2015/0046827 A1 | 2/2015 | Akselrod et al. |
| 2015/0082156 A1 | 3/2015 | Rollins et al. |
| 2015/0154660 A1 | 6/2015 | Weald et al. |
| 2015/0286489 A1 | 10/2015 | Brown, Jr. et al. |
| 2015/0356060 A1 | 12/2015 | Peden |
| 2015/0370331 A1 | 12/2015 | Gonzales |
| 2016/0110789 A1 | 4/2016 | Gilb |
| 2017/0243277 A1 | 8/2017 | You et al. |

OTHER PUBLICATIONS

U.S. Appl. No. 15/142,401, John Cronin, Automatic Customization of E-Books Based on Reader Specifications, filed Apr. 29, 2016.

U.S. Appl. No. 15/142,831, John Cronin, Interactive Network-Based Book Signing, filed Apr. 29, 2016.

U.S. Appl. No. 15/142,095, John Cronin, Social Media-Based Publishing and Feedback, filed Apr. 29, 2016.

U.S. Appl. No. 15/142,419, John Cronin, Self-Publishing Workflow, filed Apr. 29, 2016.

U.S. Appl. No. 15/142,192, John Cronin, Markup Data Augmentation Overlay, filed Apr. 29, 2016.

White, Ron; "How Computers Work", 2003 7th Edition, p. 4.

* cited by examiner

CROWD SOURCING-ASSISTED SELF-PUBLISHING

BACKGROUND OF THE INVENTION

1. Field of Invention

The present invention generally concerns book editing. More specifically, the present invention concerns a crowd-sourcing platform for editing a book manuscript prior to publication.

2. Description of the Related Art

Traditionally, an author wanting his/her book to be published and sold had to be selected by a publisher for publication. Generally, an editor would be hired during the process to proofread and edit the book before it is published and sold to the public as a finished book. The publisher typically hires skilled editors to edit the manuscripts it intends to publish prior to their publication as books.

More recently, self-publishing has risen in popularity, with the advent of websites that allow an author to upload a manuscript and immediately publish a book. However, such self-published books often do not undergo any edits from an editor, and are thus often not as good as they could be.

Crowd-sourcing is harnessing of the abilities of multiple individuals and/or computers out of a crowd, the crowd generally being users of a website, software, or service. Crowd-sourcing a process can sometimes be easier or less expensive than having one individual or computer perform the same task. For example, software service Folding@Home™ recruits its users' computers all around the world while the computers are not doing anything else to perform protein folding simulations to help cure diseases. Crowd-funding websites such as Kickstarter™ recruit their crowd of website users to pledge to fund various projects before they have been created.

Thus, there is a need for a crowd-sourced book editing platform for editing book manuscripts prior to self-publication.

SUMMARY OF THE PRESENTLY CLAIMED INVENTION

A first claimed embodiment of the present invention concerns a method for crowd-based manuscript editing that includes receiving a content dataset from an author device, the content dataset including a textual excerpt from a manuscript. The method also includes transmitting the content dataset to a plurality of editor candidate devices, the plurality of editor candidate devices including one or more editor devices. The method also includes receiving one or more edited datasets from the one or more editor devices, wherein each edited dataset includes an edited variant of the textual excerpt of the manuscript. The method also includes transmitting the one or more edited datasets to the author device. The method also includes receiving a selection input from the author device, the selection input identifying a selected edited dataset of the one or more edited datasets, the selected edited dataset including a selected edited variant of the textual excerpt and corresponding to a selected editor. The method also includes editing the manuscript by replacing the textual excerpt with the selected edited variant of the textual excerpt. The method also includes transferring a payment associated with the author device to an editor payment account associated with the selected editor.

A second claimed embodiment of the present invention concerns a system for crowd-based manuscript editing that includes a communication transceiver that is communicatively coupled at least to an author device and to a plurality of editor candidate devices. The communication transceiver receives at least a content dataset from the author device, the content dataset including a textual excerpt from a manuscript. The system also includes a memory and a processor coupled to the memory and to the communication transceiver. Execution of instructions stored in a memory by the processor performs various system operations. The system operations include triggering transmission of the content dataset to the plurality of editor candidate devices via the communication transceiver, the plurality of editor candidate devices including one or more editor devices. The system operations also include receiving one or more edited datasets from the one or more editor devices via the communication transceiver, wherein each edited dataset includes an edited variant of the textual excerpt of the manuscript. The system operations also include triggers transmission of the one or more edited datasets to the author device via the communication transceiver. The system operations also include receiving a selection input from the author device via the communication transceiver, the selection input identifying a selected edited dataset of the one or more edited datasets, the selected edited dataset including a selected edited variant of the textual excerpt and corresponding to a selected editor. The system operations also include editing the manuscript by replacing the textual excerpt with the selected edited variant of the textual excerpt. The system operations also include transfers a payment associated with the author device to an editor payment account associated with the selected editor.

A third claimed embodiment of the present invention concerns a non-transitory computer-readable storage medium, the non-transitory computer-readable storage medium having embodied thereon a program executable by a processor to perform an exemplary program method for crowd-based manuscript editing that includes receiving a content dataset from an author device, the content dataset including a textual excerpt from a manuscript. The method also includes transmitting the content dataset to a plurality of editor candidate devices, the plurality of editor candidate devices including one or more editor devices. The method also includes receiving one or more edited datasets from the one or more editor devices, wherein each edited dataset includes an edited variant of the textual excerpt of the manuscript. The method also includes transmitting the one or more edited datasets to the author device. The method also includes receiving a selection input from the author device, the selection input identifying a selected edited dataset of the one or more edited datasets, the selected edited dataset including a selected edited variant of the textual excerpt and corresponding to a selected editor. The method also includes editing the manuscript by replacing the textual excerpt with the selected edited variant of the textual excerpt. The method also includes transferring a payment associated with the author device to an editor payment account associated with the selected editor.

DETAILED DESCRIPTION

An author using an author device may connect to a self-publishing network and identify a content selection that includes text from the author's manuscript. The content selection may be presented to a number of crowd editors through their crowd editor devices. The crowd editors may submit edited selections that include edits to the content selection. The author may then select a first edited selection of the edited selections and purchase that edited selection to be included in the manuscript, which also allows the author to then interact with a first content editor who edited the first edited selection. The author may send the first content editor a closed bid to edit more of the author's manuscript, which the first content editor can accept or decline, or negotiate. The author may alternately send more open bids to all or a subset of the crowd editors.

Figure 1:
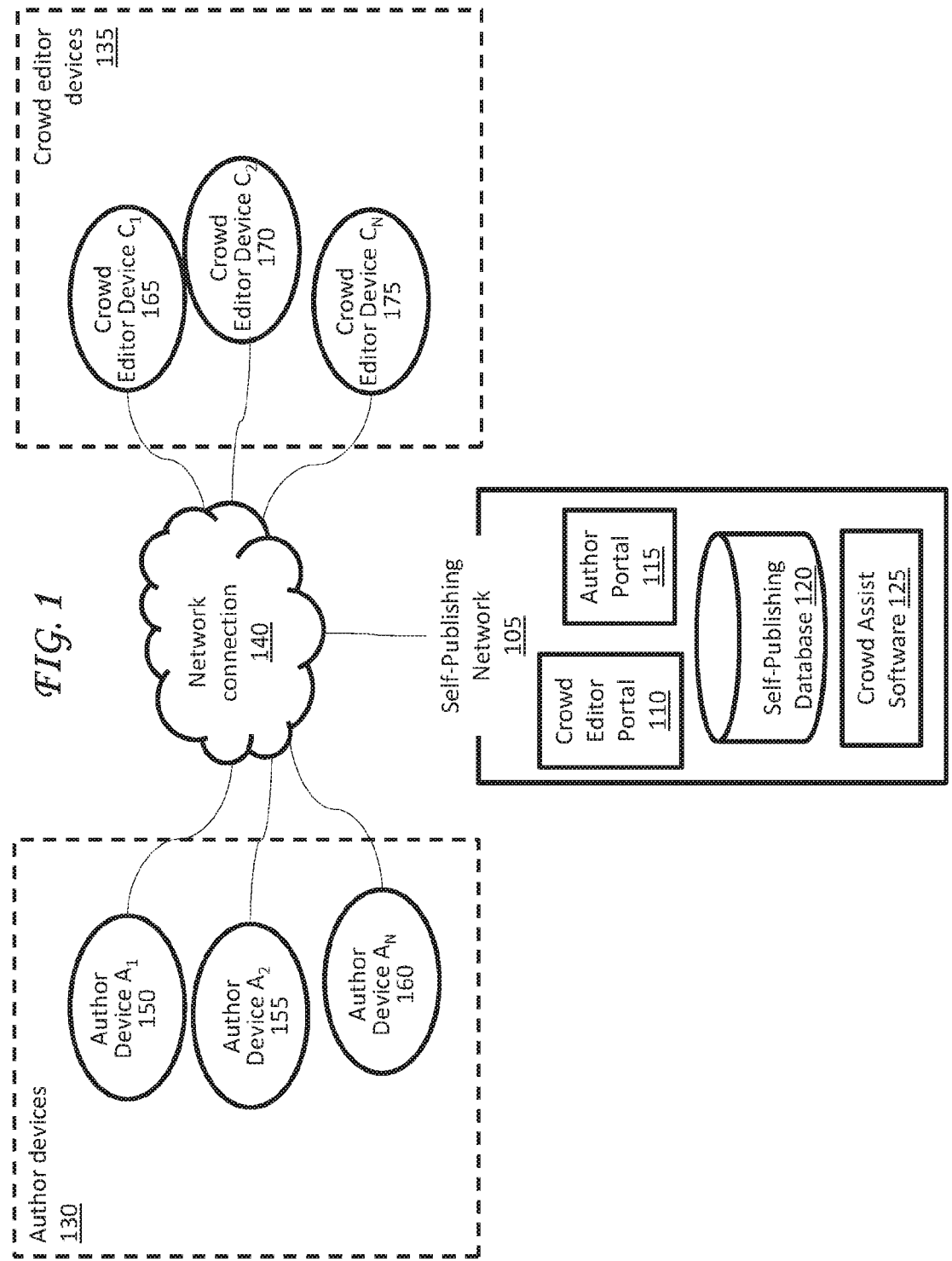
FIG. 1 illustrates an exemplary self-publishing network ecosystem.

FIG. 1 illustrates an exemplary self-publishing network ecosystem.

The self-publishing network ecosystem of FIG. 1 includes a self-publishing network 105 that is communicatively coupled to one or more author devices 130 and one or more crowd editor devices 135 via a network connection 140. The network connection may be include a connection through a private network, such as a local area network (LAN), a wireless local area network (WLAN), a municipal area network (MAN), a wide area network (WAN), or some combination thereof. The network connection may also include a connection through the public Internet.

Figure 7:
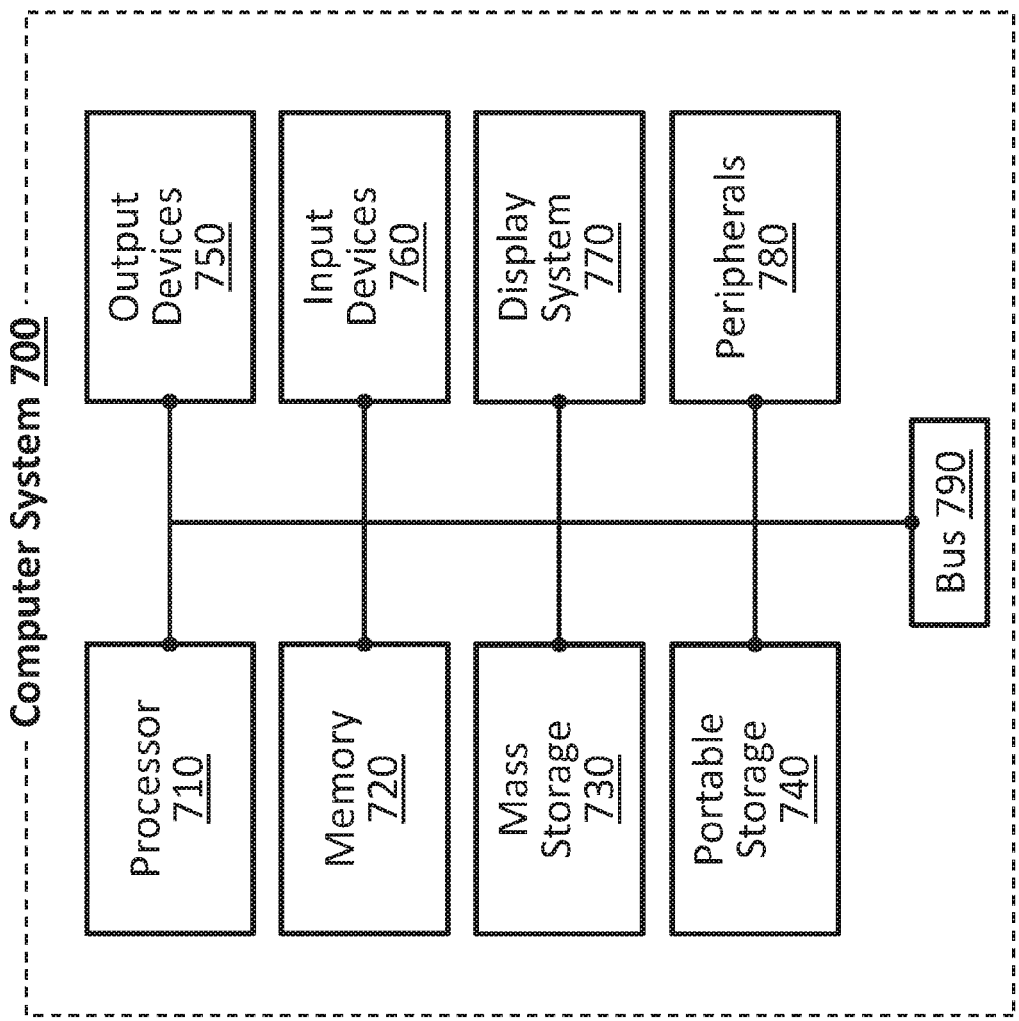
FIG. 7 is a block diagram of an exemplary computing device that may be used to implement an embodiment of the present invention.

The self-publishing network 105 includes one or more server(s) (not pictured), which may each be some variety of computer system 700 or may include at least a subset of the hardware components and software elements identified in FIG. 7. The server(s) may, for example, include some kind of memory or data storage (e.g. memory 720, mass storage 730, portable storage 740, or some combination thereof), some kind of processor (e.g. processor 710), some kind of input mechanism(s) (e.g. one or more of the identified input devices 760), and some kind of display system (e.g., display system 770).

The self-publishing network 105 may include a variety of hardware components (e.g., included within or coupled to one or more of the servers), a variety of stored data (e.g., stored in one or more memory or data storage elements of one or more of the servers), and a variety of software elements (e.g., executed by one or more processors of one or more of the servers).

The self-publishing network 105 may include an author portal 115, which may be an interactive portal, such as an Internet-accessible website or an intranet-accessible page or a software application that uses an Application Programming Interface (API) associated with the self-publishing network 105. The author portal 115 of the self-publishing network 105 may include one or more graphical user interfaces (GUIs) (e.g., see GUI 205 of FIG. 2) which may be made accessible to one or more of the author devices 130 and may allow the one or more of the author devices 130 to perform various operations related to self-publishing and seeking crowd-sourced assistance.

The self-publishing network 105 may include a crowd editor portal 110, which may be an interactive portal, such as an Internet-accessible website or an intranet-accessible page or a software application that uses an Application Programming Interface (API) associated with the self-publishing network 105. The crowd editor portal 110 of the self-publishing network 105 may include one or more graphical user interfaces (GUIs) (e.g., see GUI 305 of FIG. 3) which may be made accessible to one or more of the crowd editor devices 135 and may allow the one or more of the crowd editor devices 135 to perform various operations related to providing crowd-sourced assistance for self-publishing authors.

Figure 5:
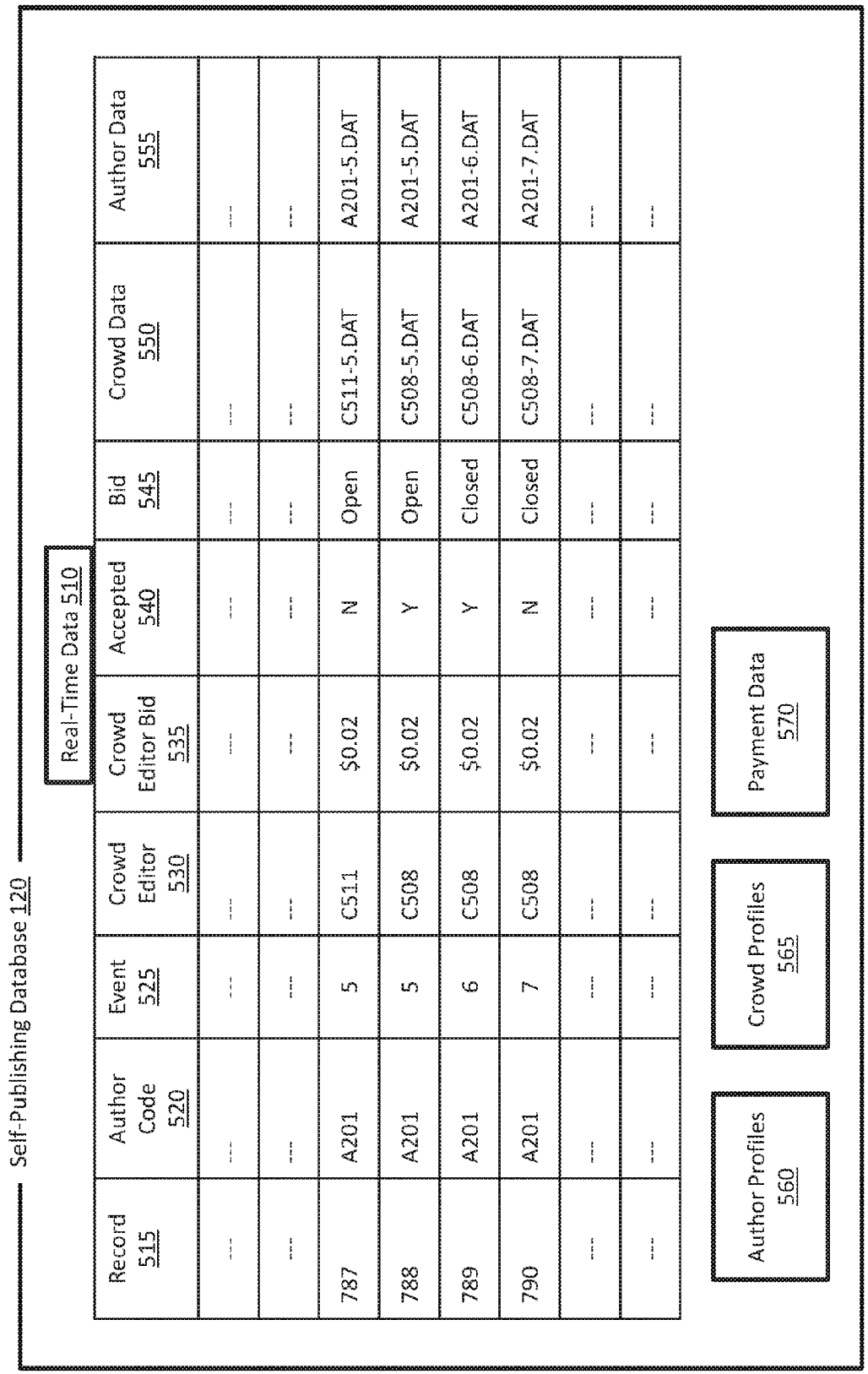
FIG. 5 illustrates exemplary entries in an exemplary self-publishing database.

The self-publishing network 105 may include a self-publishing database 120. The self-publishing database 120 may include inputs from one or more author devices 130 (e.g., by one or more authors) and/or from one or more crowd editor devices 135 (e.g., by one or more crowd editors). Exemplary entries into an exemplary self-publishing database 120 are depicted in FIG. 5.

The self-publishing network 105 may finally include a crowd assist software 125, which may bring together data input into the crowd editor portal 110 and the author portal 115 into the self-publishing database 120, and may likewise bring data from the self-publishing database 120 into the crowd editor portal 110 and author portal 115. The crowd assist software 125 may also perform various functions, such as handling bids or transmitting notifications to particular author devices 130 and/or crowd editor devices 135. Some exemplary operations of the crowd assist software are illustrated in the flow diagrams of FIG. 4.

Each of the author devices 130 and crowd editor devices 135 may be some variety of computer system 700 or may include at least a subset of the hardware components and software elements identified in FIG. 7. The author devices 130 and crowd editor devices 135 may each, for example, include some kind of memory or data storage (e.g., memory 720, mass storage 730, portable storage 740, or some combination thereof), some kind of processor (e.g. processor 710), some kind of input mechanism(s) (e.g. one or more of the identified input devices 760), and some kind of display system (e.g., display system 770).

The author devices 130 depicted in FIG. 1 include author device $A_1$ 150, author device $A_2$ 155, and other author devices up to author device $A_N$ 160. The crowd editor devices 135 depicted in FIG. 1 include crowd editor device $C_1$ 165, crowd editor device $C_2$ 170, and other crowd editor devices up to crowd editor device $C_N$ 175.

Figure 2:
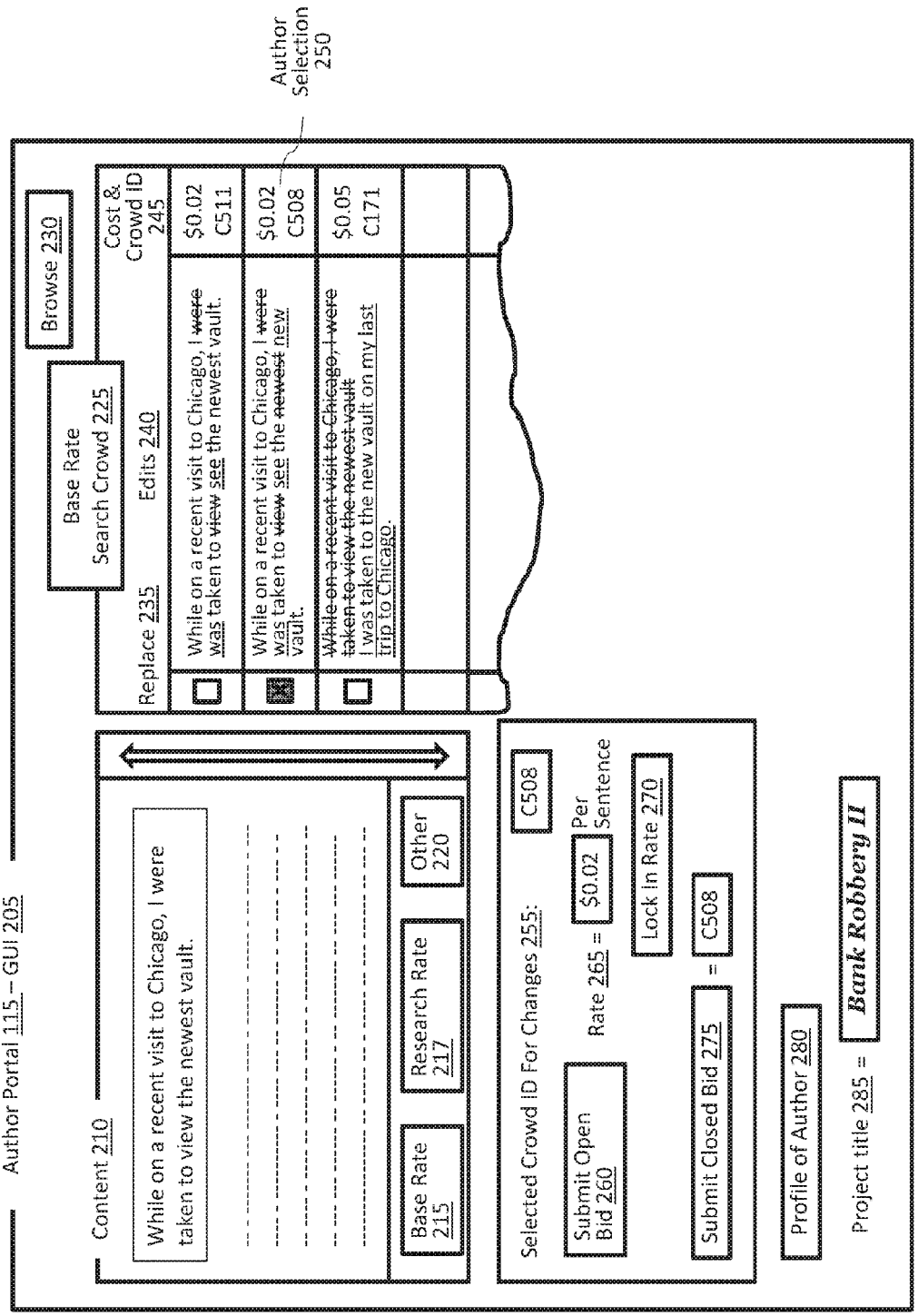
FIG. 2 illustrates an author portal graphical user interface.

FIG. 2 illustrates an author portal graphical user interface. The graphical user interface (GUI) 205 of the author portal 115 illustrated in FIG. 2 includes various GUI elements.

For example, the GUI 205 includes a content selection 210, where the author can select a portion of text from a manuscript that the author would like to have crowd editors bid to edit. This portion of text may be one or more words, one or more phrases, one or more sentences, one or more paragraphs, one or more chapters, or even one or more whole book manuscripts. In FIG. 2, the content selection 210 chosen by the author is a sentence stating "While on a recent visit to Chicago, I were taken to view the newest vault." The author can request base-rate editing (e.g., editing for spelling, grammar, formatting, layout, consistency, tone, storyline, fonts) via a "base rate" button 215, or can request research-rate editing (e.g., checking/fixing accuracy of equations and/or diagrams and/or other mathematic, statistical, scientific, geographical, engineering, historic, legal, economic, or political research) via a "research rate" button 217, or other types of editing via an "other" button 220. For example, a base-rate editing could fix grammatical mistakes in the sentence (e.g., "were" to "was") whereas a research-rate editing could determine whether the vault in question was actually the newest vault, and whether it was in fact located in Chicago.

The manuscript may include text as well as images and other rich media content. Rich media, as used in the present disclosure, refers to content that may include not only text (i.e. words) or images (i.e. pictures) to convey information to the user, but may also include or utilize a variety of advanced features such as video and audio that encourages viewers to interact and engage with the content being viewed. The manuscript content discussed herein may include a variety of rich media, as well as traditional text or image content.

The base rate search crowd interface 225 may be displayed in the GUI 205 once the author has requested a base-rate editing via the "base rate" button 215. The base rate search crowd interface 225 includes an "edits" column 240, where particular edits to the content selection 210 are identified (e.g., with strikethroughs identifying removals and underlines identifying additions). The base rate search crowd interface 225 also includes a "cost and crowd ID" column 245, where a cost is identified associated with a particular edit by a particular editor (e.g., $0.02, $0.05), and where a crowd ID is identified that identifies a particular editor, either by a recognizable name or username (e.g., so that authors can recognize a well-known editor who normally works with professional publishers but also works using this platform and wishes to be recognized) or by an anonymous alphanumeric code or username (e.g., if an editor prefers to be anonymous). The base rate search crowd interface 225 also includes a "replace" column 235, where the author selects which edit he/she wishes to select to replace the current content selection. For example, in FIG. 2, the author has chosen the author selection 250 (e.g., "While on a recent visit to Chicago, I was taken to see the new vault," an edit which costs $0.02 and was edited by a crowd editor with crowd ID of "C508"). The base rate search crowd interface 225 may also include a "browse" button or interface 230 that additionally aids the author in browsing through crowd editor edit submissions, such as by identifying reviews for various crowd editors or by identifying past edits made by various crowd editors.

A research rate search crowd interface (not shown) or other search crowd interface (not shown) similar to the base rate search crowd interface 225 may be displayed in the GUI 205 in response to a request for research-rate editing via the "research rate" button 217 or other editing via the "other" button 220, respectively.

Once the author has selected an edit of a particular editor (e.g., the editor identified by crowd ID "C508") via the author selection 250, this selection may then be shown again in a "selected Crowd ID for changes" selection 255.

If the author likes that editor's work (or another editor's work), the author can then identify a rate 265 that the author would like to pay for the remaining edits, and use a "submit closed bid" button 275 to submit that proposed rate only to an editor identified in a selection box next to the "submit closed bid" button 275 (e.g. identifying Crowd ID "C508" in FIG. 2). The identified editor in selection 255 may then receive the closed bid (e.g., at the GUI 305 or another GUI of the crowd editing portal 110), and if the editor agrees to the rate 265 associated with the closed bid 275, the author and editor may agree to lock in the rate using the "lock in the rate" function 270. Alternately, the author may elect to submit an open bid (e.g., open to all editors or a subset of all editors) using the "submit open bid" button 260, after which the author may receive a list of editors who have agreed to the rate 265 who can be locked in using the "lock in the rate" function 270.

The GUI 205 may also include a "Profile of Author" button 280, which may allow the author to view and/or edit his/her own profile, which may include biographical information, photos, past manuscripts, past published works, writing samples, reviews (e.g. of the author's writing as well as timeliness of payment and responsiveness to editors), financial information (e.g., credit score, validation by a financial entity that the author is able to pay, publicly concealed credit card information, publicly concealed debit card information, publicly concealed bank account information), or some combination thereof.

The GUI 205 may also include a "project title" section 285 that identifies a title for the project associated with the manuscript (e.g., "Bank Robbery II").

Figure 3:
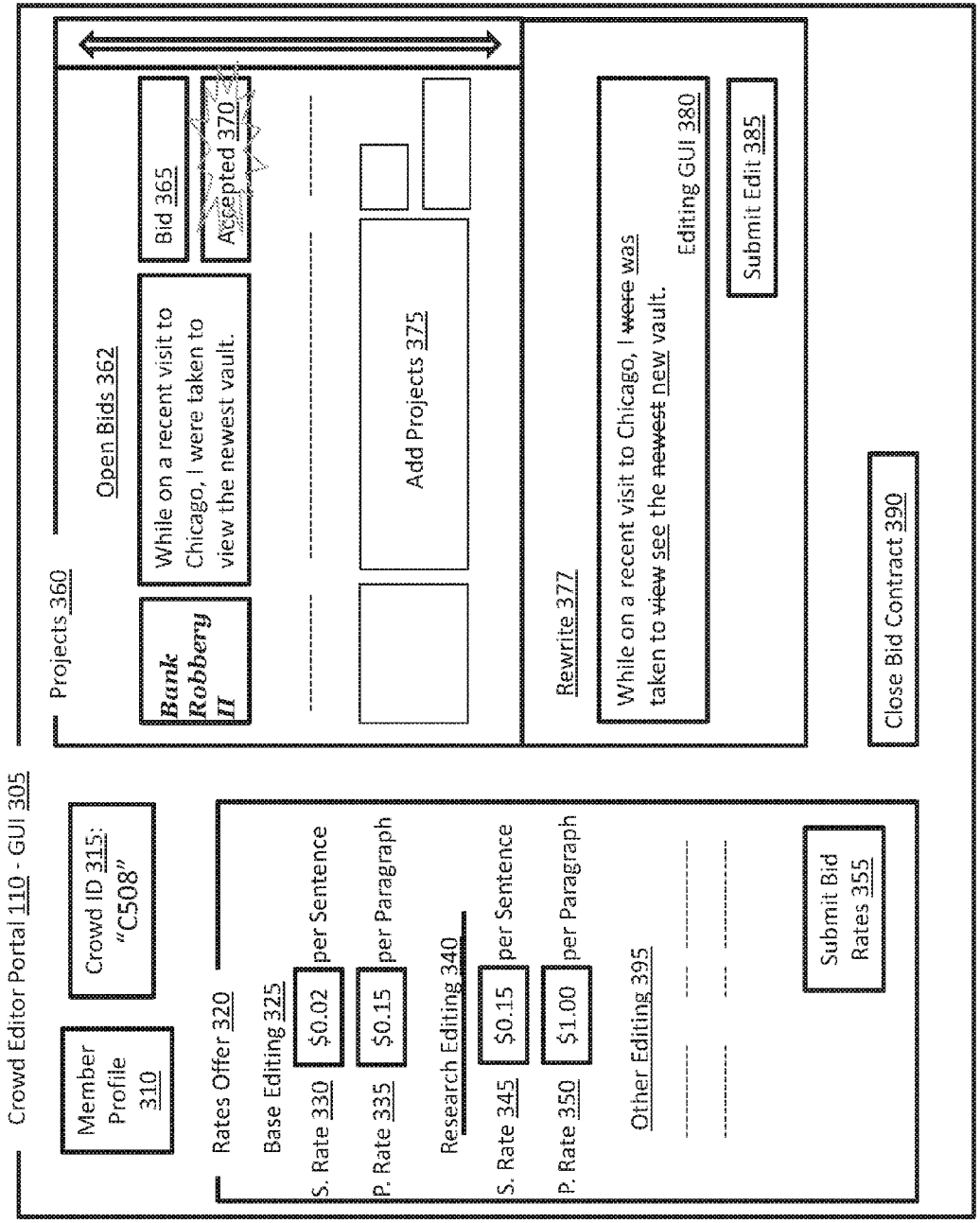
FIG. 3 illustrates a crowd editor graphical user interface.

FIG. 3 illustrates a crowd editor graphical user interface. The graphical user interface (GUI) 305 of the crowd editor portal 110 illustrated in FIG. 3 includes various GUI elements.

For example, the GUI 305 may include a "member profile" button 310, which may allow the crowd editor to view and/or edit his/her own profile, which may include biographical information, photos, past edits (e.g., of unfinished manuscripts as well as published works), writing samples, reviews (e.g. of the editor's reviews as well as timeliness of editing work and responsiveness to authors), financial information (e.g., preferred form of payment), editing rate information (e.g., their typical base editing rates, their typical research editing rates, their typical other editing rates), or some combination thereof.

The GUI 305 may include a "crowd ID" field 315, where the crowd editor may identify a crowd ID that the crowd editor wishes to use to identify himself/herself and his/her edits within the context of the self-publishing network 105. The "crowd ID" field 315 may allow for the user to select his/her crowd ID, which may for example include a name (which may in some cases be verified by the self-publishing network 105 to ensure that nobody fraudulently impersonates a popular or famous editor, for example) or username, or may be automatically generated by the crowd editor portal 110 and/or by the self-publishing network 105 (e.g., to ensure that the crowd editor and his/her work remains anonymous).

The GUI 305 may include a "rates offer" field 320 where the crowd editor may allow the crowd editor, through one of the crowd editor devices 135, to enter base editing rates 325 and research editing rates 340. These may be varied based on the amount of editing requested. For example, the base editing cost 325 of FIG. 3 includes a per-sentence rate 330 listed as $0.02 per sentence and a per-paragraph rate 335 listed as $0.15 per paragraph. Likewise, the research editing cost 340 of FIG. 3 includes a per-sentence rate 345 listed as $0.15 per sentence and a per-paragraph rate 350 listed as $1.00 per paragraph. An "other editing" cost section 395 is also identified in the "rates offer" field 320, though the "other editing" cost section 395 has not been filled out by the crowd editor and may for example be open to bids from authors depending on what type of editing is requested (e.g., artistic editing of illustrations or drawings). A "submit bid rates" button 355 may publicize these bid rates to authors and may make them effective for a particular editing project.

The "rates offer" field 320 may also be used to receive rate bids from authors (e.g., input via the GUI 205 of the author portal 115) for particular projects, and to accept or reject those bids to finalize and lock in a particular rate for a particular project.

The GUI 305 may include a "projects" field 360, where particular editing projects may be identified or added. For example, the projects field 360 of FIG. 3 includes a listing of open bids 362, which currently lists a single project but could list others in other embodiments. The single project listed under the open bids listing 362 is identified by a project title (e.g. "Bank Robbery II") and a content selection from an author that is to be edited (e.g., the content selection 210 from FIG. 2, which here reads "While on a recent visit to Chicago, I were taken to view the newest vault"). The single project listed also includes a "bid" button 365 allowing the content editor to submit an edit, as well as a proposed rate for editing work, as a bid for editing work. The "accepted" indicator 370 indicates that the author of the content selection has reviewed the content editor's bid and has accepted the bid. The "projects" field 360 of the GUI 305 also includes an "add projects" GUI element 375 allowing the crowd editor to search for other editing projects and add those projects to submit editing bids on those projects, and then use the "projects" field 360 to manage those projects.

The GUI 305 may include a "rewrite" field 377 that functions as a text editing graphical user interface (GUI) 380 wherein the crowd editor can edit a particular content selection from an open bid (e.g., a particular project from the open bids listing 362, which in FIG. 2 is the "Bank Robbery II" project's content selection). The editing GUI 380 may include features such as identifying deletions (e.g., with a strikethrough or a different text color or a colored text highlight) and identifying additions (e.g., with an underline or a different text color or a colored text highlight). Once the crowd editor has completed an edit in the editing GUI 380, the crowd editor may submit the edit using a "submit edit" button 385.

The GUI 305 finally includes a "close bid contract" button 390 that may provide a long-term contract between the crowd editor and the author. The "close bid contract" button 390 may in some circumstances provide an additional GUI (not shown) so that the author and crowd editor can work out additional details of such a long-term contract, such as timeline and pay schedule.

Figure 4:
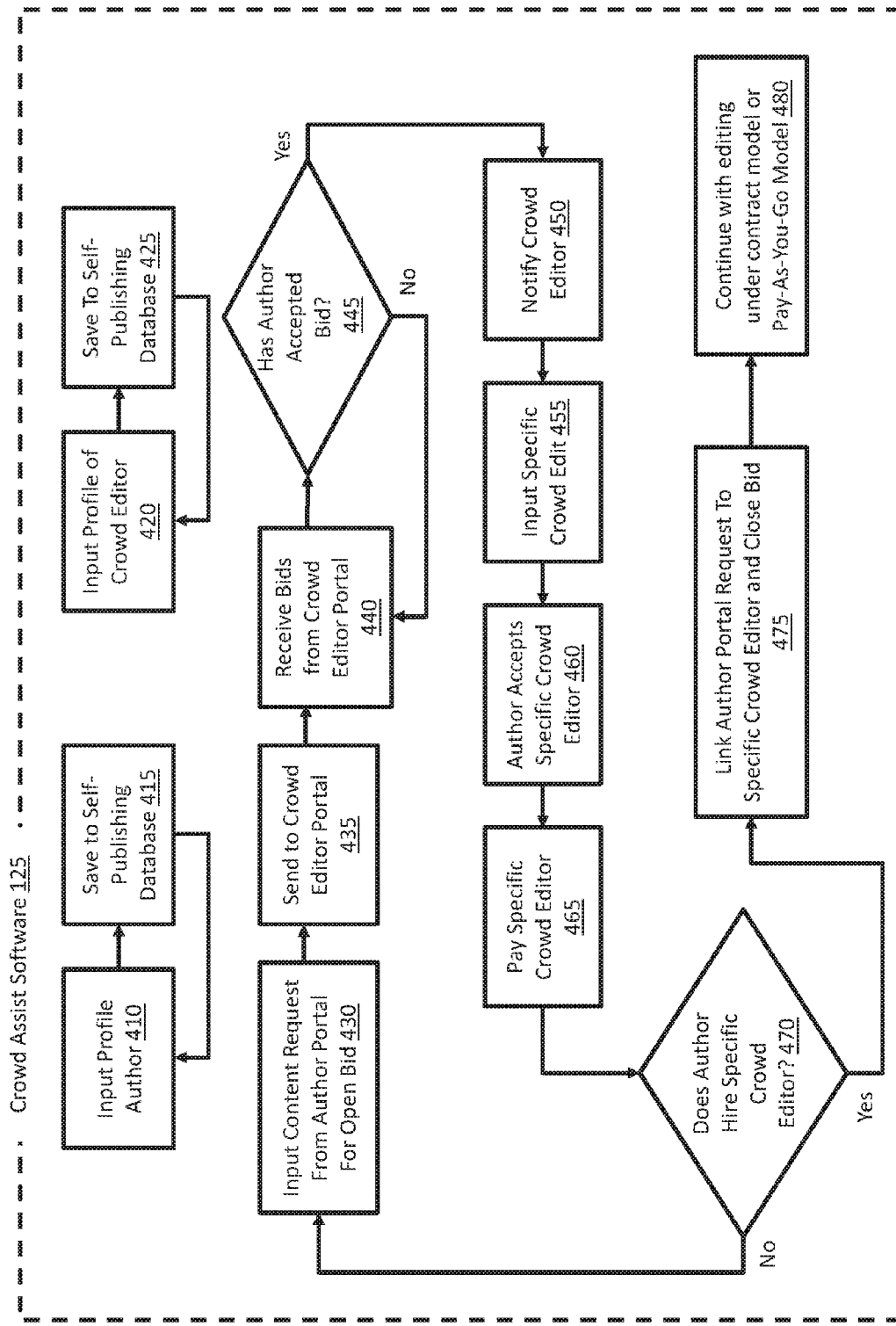
FIG. 4 includes three flow diagrams illustrating exemplary crowd assistance operations of a crowd assist software.

FIG. 4 includes three flow diagrams illustrating exemplary crowd assistance operations of a crowd assist software.

The first flow diagram of FIG. 4 includes two steps. In step 410, an author profile may associated with a particular author be input into a user interface, for example by the author when using the author portal 115, or alternately by a third party such as a customer service representative assisting the author personally or via a telephone. Then, in step 415, the author's profile information is stored in the self-publishing database 120. The process then repeats at step 410 for additional authors.

The second flow diagram of FIG. 4 also includes two steps. In step 420, a crowd editor profile associated with a particular crowd editor may be input into a user interface, for example by the crowd editor when using the crowd editor portal 110, or alternately by a third party such as a customer service representative assisting the crowd editor personally or via a telephone. Then, in step 425, the crowd editor's profile information is stored in the self-publishing database 120. The process then repeats at step 410 for additional crowd editors.

The third flow diagram of FIG. 4 includes more steps, described below.

At step 430, a content request identifying a content selection (e.g. content selection 210) is received from the author portal 115 as an input at the self-publishing network 105. At step 435, the self-publishing network 105 sends the content selection to the crowd editor portal 110 (e.g. as a project in the projects field 360). At 440, the self-publishing network 105 receives bids from the crowd editor portal 110 for edits. At step 445, the self-publishing network 105 determined if the author has accepted a bid from the crowd editors (e.g. using the author portal 115). If not, the self-publishing network 105 continues to receive bids and provide them to the author at step 440.

Once the author has accepted a bid at step 445, then at step 450, the self-publishing network 105 notifies the crowd editor whose bid has been accepted (e.g., via an "accepted" indicator 370). At step 455, the self-publishing network 105 then inputs the edit into the manuscript. At step 460, the author may then accept the crowd editor who wrote the edit, and at step 465 the author may pay the crowd editor who wrote the edit.

At step 470, the self-publishing network 105 then determines whether the author has indicated a desire to hire that specific crowd editor (e.g., to edit another portion of the manuscript, or to edit the remainder of the manuscript). If not, the self-publishing network 105 may return to a content-request-based model starting back at step 430, but if so, the self-publishing network 105 may then link the author and crowd editor together via the author portal 115 and/or the crowd editor portal 110 in order to close a hiring bid and determine other details regarding future work, such as whether the work should be contract-based (e.g., and then discussing duration, payment schedules, termination clauses, and so forth) or more of a pay-as-you-go system (e.g., with less commitment by the author and/or the selected crowd editor). At step 480, the self-publishing network 105 may continue to facilitate editing work between the author and the crowd editor (and/or one or more other crowd editors), either based on a contract model (e.g., set duration) or based on a pay-as-you-go model.

FIG. 5 illustrates exemplary entries in an exemplary self-publishing database.

The exemplary self-publishing database 120 of FIG. 5 includes multiple exemplary entries, illustrated as rows, the entries including a variety of categories of data organized into columns.

The exemplary self-publishing database 120 of FIG. 5 includes a "record" column 515 numerically identifying a particular exchange between an author (e.g., via the author portal 115 using one of the author devices 130) and a crowd editor (e.g. via the crowd editor portal 110 using one of the crowd editor devices 135). For example, the "record" column 515 of FIG. 5 includes records 787 through 790 numbered sequentially.

The exemplary self-publishing database 120 of FIG. 5 includes a "author code" column 520 that identifies the author (e.g. identifying a user account at the self-publishing network 105 that is associated with the author) using a name, username, or alphanumeric code (e.g., "A201").

The exemplary self-publishing database 120 of FIG. 5 includes a "event" column 525 that identifies a number associated with a particular content selection (e.g., content selection 210 of FIG. 2) of the author's manuscript.

The exemplary self-publishing database 120 of FIG. 5 includes a "crowd editor" column 530 that identifies the crowd editor (e.g. identifying a user account at the self-publishing network 105 that is associated with the crowd editor) using a name, username, or alphanumeric code (e.g., "C511", "C508").

The exemplary self-publishing database 120 of FIG. 5 includes a "crowd editor bid" column 535 that identifies a cost charged by the crowd editor identified in column 530 for a particular edit (e.g., at a base editing rate, a research editing rate, or an "other" editing rate).

The exemplary self-publishing database 120 of FIG. 5 includes a "accepted" column 540 that identifies a whether a particular bid has been accepted (e.g., as identified by "accepted" identifier 370 of FIG. 3).

The exemplary self-publishing database 120 of FIG. 5 includes a "bid" column 545 that identifies a whether a particular bid is open (e.g., open to be undertaken by more than one crowd editor) or closed (e.g., presented to a single crowd editor).

The exemplary self-publishing database 120 of FIG. 5 includes a "crowd data" column 550 that identifies a pointer to a data file including edits proposed by the crowd editor identified in column 530.

The exemplary self-publishing database 120 of FIG. 5 includes a "author data" column 555 that identifies a pointer to a data file including the content selection that has been edited in the data of column 550.

The data in the self-publishing database 120 may be updated in real-time as indicated by the "real-time data" indicator 510, which may be presented in a database-reading GUI when the data has been updated. GUI buttons associated with author profiles 560, crowd editor profiles 565, and payment data 570 (e.g., credit card, debit card, bank account, electronic payment account) indicates that the self-publishing database 120 may also store such data, or that other databases stored in the self-publishing network 105 may store such data.

Figure 6:
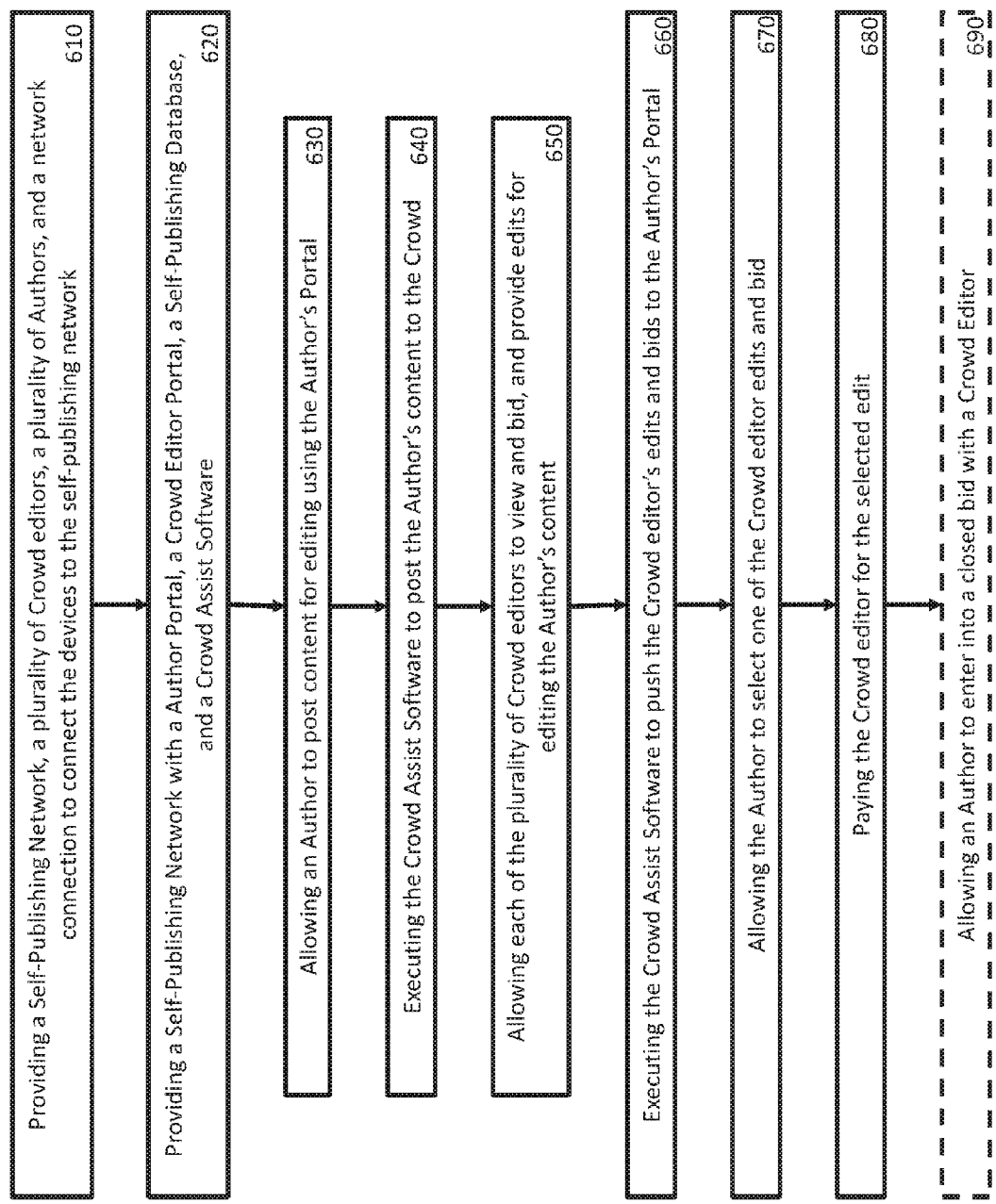
FIG. 6 illustrates an exemplary overall method of the present invention as described herein.

FIG. 6 illustrates an exemplary overall method of the present invention as described herein.

At step 610, the method includes providing a self-publishing network 105, a plurality of crowd editors (with crowd editor devices 135), a plurality of authors (with author devices 130), and a network connection 140 to connect the devices to the self-publishing network 105.

At step 620, the method includes providing the self-publishing network 105 with an author portal 115, a crowd editor portal 110, a self-publishing database 120, and a crowd assist software 125.

At step 630, the method includes allowing an author to post content for editing using the author portal 115.

At step 640, the method includes executing the crowd assist software 125 to post the author's content to the crowd.

At step 650, the method includes allowing each of the plurality of crowd editors to view and bid, and provide edits for editing the author's content.

At step 660, the method includes executing the crowd assist software 125 to push the crowd editor's edits and bids to the author portal 115.

At step 670, the method includes allowing the author to select one of the crowd editor edits and bid.

At step 680, the method includes paying the crowd editor for the selected edit.

Optionally, at step 690, the method may include allowing an author to enter into a closed bid with a crowd editor.

The crowd assist software 125 may also be used to allow crowd editors to vote on existing edits publicly or semi-publicly (e.g., within an identified group of crowd editors). An author may use such a voting service to gauge, for example, which edited version of a chapter is the best-liked. Such voting can give voting crowd editors payment (e.g., from the author) or can be voluntary and unpaid.

FIG. 7 illustrates an exemplary computing system 700 that may be used to implement an embodiment of the present invention. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, tablet computing device, video game console, e-book reader, media player device, vehicle-based computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for crowd-based manuscript editing that is implemented by a network-connected server, the method comprising:
    receiving a textual excerpt file from an author device over a communication network, the textual excerpt file including a first textual excerpt from a manuscript;
    transmitting the textual excerpt file over the communication network to a distributed plurality of editor devices;
    receiving a plurality of edited variants of the textual excerpt file over the communication network from the distributed plurality of editor devices, wherein each edited variant of the textual excerpt file is generated at one of the distributed plurality of editor devices and is associated with one of a distributed plurality of editors;
    transmitting the plurality of edited variants of the textual excerpt file over the communication network to the author device;
    receiving a plurality of crowd votes associated with the plurality of edited variants of the textual excerpt file from a distributed plurality of voter devices, wherein each of the received plurality of crowd votes is generated by and received over the communication network from one of the distributed plurality of voter devices;
    generating a ranking of the plurality of edited variants of the textual excerpt file that ranks the plurality of edited variants of the textual excerpt file from a best-liked edited variant of the textual excerpt file onward gauged based on the plurality of crowd votes;
    transmitting the ranking of the plurality of edited variants of the textual excerpt file over the communication network to the author device;
    receiving a selection input from the author device, the selection input identifying a selected edited variant of the textual excerpt file of the plurality of edited variants of the textual excerpt file, wherein the selected edited variant of the textual excerpt file corresponds to a selected editor of the distributed plurality of editors;
    editing the manuscript by replacing the textual excerpt file with the selected edited variant of the textual excerpt file;
    transmitting a second textual excerpt from the manuscript to a selected editor device of the distributed plurality of editor devices but not to a remainder of the distributed plurality of editor devices other than the selected editor device in response to receipt of the selection input, the selected editor device corresponding to the selected editor; and
    initiating transfer of a payment associated with the author device to an editor payment account associated with the selected editor in response to editing the manuscript.

2. The method of claim 1, further comprising:
    transmitting a selected editor identifier to the author device, the selected editor identifier identifying the selected editor;
    receiving a bid from the author device, the bid being an offer to the selected editor to edit the second textual excerpt of the manuscript;
    transmitting the bid to the selected editor device;
    receiving an editor bid agreement input from the selected editor device indicating agreement to the bid; and
    receiving the second textual excerpt of the manuscript from the author device.

3. The method of claim 2, further comprising:
    receiving a proposed editing payment rate from the selected editor device;
    transmitting the proposed editing payment rate to the author device; and
    receiving a payment rate agreement input from the author device indicating that the author agrees with the proposed editing payment rate.

4. The method of claim 2, further comprising:
    receiving a proposed editing payment rate from the author device;
    transmitting the proposed editing payment rate to the selected editor device; and
    receiving a payment rate agreement input from the selected editor device indicating that the selected editor agrees with the proposed editing payment rate.

5. The method of claim 2, wherein the bid is a closed bid and is not transmitted to any additional editor devices other than the selected editor device.

6. The method of claim 1, wherein initiating transfer of the payment associated with the author device to the editor payment account is based on a selected editing payment rate set by the selected editor device.

7. The method of claim 1, wherein initiating transfer of the payment associated with the author device to the editor payment account is based on a selected editing payment rate set by the author device and agreed to by the selected editor device.

8. The method of claim 1, wherein the author device is one of a smartphone, a tablet computing device, a laptop computer, a desktop computer, an electronic book reader device, a video game console, a media player device, a vehicle-based computer, or some combination thereof.

9. The method of claim 1, wherein the selected editor device is one of a smartphone, a tablet computing device, a laptop computer, a desktop computer, an electronic book reader device, a video game console, a media player device, a vehicle-based computer, or some combination thereof.

10. The method of claim 2, wherein the bid is an open bid and is additionally transmitted to one or more additional editor devices other than the selected editor device.

11. The method of claim 1, wherein the selection input is based on the ranking.

12. The method of claim 1, further comprising publishing the edited manuscript by storing the edited manuscript at one or more servers that transmit the edited manuscript to one or more recipient devices.

13. A system for crowd-based manuscript editing, the system comprising:
   a communication transceiver that is communicatively coupled at least to an author device and to a distributed plurality of editor devices, the communication transceiver receiving a textual excerpt file from the author device over a communication network, the textual excerpt file including a first textual excerpt from a manuscript;
   a memory that stores instructions; and
   a processor coupled to the memory and to the communication transceiver, wherein execution of the instructions by the processor causes the system to:
      transmit the textual excerpt file to the distributed plurality of editor devices via the communication transceiver,
      receive a plurality of edited variants of the textual excerpt file from the distributed plurality of editor devices via the communication transceiver, wherein each edited variant of the textual excerpt file is generated at one of the distributed plurality of editor devices and is associated with one of a distributed plurality of editors,
      transmit the plurality of edited variants of the textual excerpt file to the author device via the communication transceiver,
      receive a plurality of crowd votes associated with the plurality of edited variants of the textual excerpt file from a distributed plurality of voter devices via the communication transceiver, wherein each of the received plurality of crowd votes is generated by and received via the communication transceiver from one of the distributed plurality of voter devices,
      generate a ranking of the plurality of edited variants of the textual excerpt file that ranks the plurality of edited variants of the textual excerpt file from a best-liked edited variant of the textual excerpt file onward gauged based on the plurality of crowd votes,
      transmit the ranking of the plurality of edited variants of the textual excerpt file to the author device via the communication transceiver,
      receive a selection input from the author device via the communication transceiver, the selection input identifying a selected edited variant of the textual excerpt file of the plurality of edited variants of the textual excerpt file, wherein the selected edited variant of the textual excerpt file corresponds to a selected editor of the distributed plurality of editors,
      edit the manuscript by replacing the textual excerpt file with the selected edited variant of the textual excerpt file,
      transmit a second textual excerpt from the manuscript to a selected editor device of the distributed plurality of editor devices but not to a remainder of the distributed plurality of editor devices other than the selected editor in response to receipt of the selection input, the selected editor device corresponding to the selected editor, and
      initiate transfer of a payment associated with the author device to an editor payment account associated with the selected editor in response to editing the manuscript.

14. The system of claim 13, wherein the system comprises a plurality of computer systems, wherein the processor comprises one or more processors across the plurality of computer systems, wherein the memory comprises one or more memories across the plurality of computer systems, and wherein the communication transceiver comprises one or more communication transceivers across the plurality of computer systems.

15. The system of claim 13, wherein the communication transceiver is connected to at least one of a private network, an Internet connection, or some combination thereof.

16. The system of claim 13, further comprising a database stored in the memory, the database storing the textual excerpt file, the selected edited variant of the textual excerpt file, an author identifier identifying an author associated with the author device, and a selected editor identifier identifying the selected editor.

17. The system of claim 13, wherein the author device and the selected editor device are electronic communication devices, wherein each electronic communication device is one of a smartphone, a tablet computing device, a laptop computer, a desktop computer, an electronic book reader device, a video game console, a media player device, a vehicle-based computer, or some combination thereof.

18. The system of claim 13, further comprising a publication server associated with a publication service, wherein execution of the instructions by the processor further triggers transmission of the edited manuscript to the publication server via the communication transceiver, thereby publishing the edited manuscript via the publication service.

19. A non-transitory computer-readable storage medium, having embodied thereon a program executable by a processor to perform a method for crowd-based manuscript editing, the method comprising:
   receiving a textual excerpt file from an author device over a communication network, the textual excerpt file including a first textual excerpt from a manuscript;
   transmitting the textual excerpt file over the communication network to a distributed plurality of editor devices;
   receiving a plurality of edited variants of the textual excerpt file over the communication network from the distributed plurality of editor devices, wherein each edited variant of the textual excerpt file is generated at one of the distributed plurality of editor devices and is associated with one of a distributed plurality of editors;
   transmitting the plurality of edited variants of the textual excerpt file over the communication network to the author device;
   receiving a plurality of crowd votes associated with the plurality of edited variants of the textual excerpt file from a distributed plurality of voter devices, wherein each of the received plurality of crowd votes is generated by and sent over the communication network from one of the distributed plurality of voter devices;

generating a ranking of the plurality of edited variants of the textual excerpt file that ranks the plurality of edited variants of the textual excerpt file from a best-liked edited variant of the textual excerpt file onward gauged based on the plurality of crowd votes;

transmitting the ranking of the plurality of edited variants of the textual excerpt file over the communication network to the author device;

receiving a selection input from the author device, the selection input identifying a selected edited variant of the textual excerpt file of the plurality of edited variants of the textual excerpt file, wherein the selected edited variant of the textual excerpt file corresponds to a selected editor of the distributed plurality of editors;

editing the manuscript by replacing the textual excerpt file with the selected edited variant of the textual excerpt file;

transmitting a second textual excerpt from the manuscript to a selected editor device of the distributed plurality of editor devices but not to a remainder of the distributed plurality of editor devices other than the selected editor device in response to receipt of the selection input, the selected editor device corresponding to the selected editor; and initiating transfer of a payment associated with the author device to an editor payment account associated with the selected editor in response to editing the manuscript.

* * * * *